3,336,139
MOLDED FOOD BAR AND MATRIX
Paul J. Mech, Long Island City, N.Y., Richard W. Groncki, Park Ridge, N.J., and Thomas A. Smith, Brooklyn, N.Y., assignors to Evans Research and Development Corporation, New York, N.Y., a corporation of New York
No Drawing. Filed Aug. 9, 1965, Ser. No. 478,471
8 Claims. (Cl. 99—124)

This invention relates to a novel food bar which may be eaten as such or hydrated and dispersed in water to yield acceptable, familiar menu items such as casseroles, puddings, soups, etc. More particularly, this invention relates to a novel food bar with a novel, all-purpose matrix.

Food bars of various types have been utilized by Armed Forces, explorers, hikers, travellers, etc., for many years. The advantages of rations in this form are obvious. They provide nutritional value in a compact and convenient form; they also may be stored for considerable duration without spoilage. This type bar is consumed as a bar. While these bars fulfill the function of a necessary and convenient source of nutritional value they are not suitable for use in other forms, such as a hydrated form. The food bars are bound together by proteins, e.g. soya, starches, fats, etc. The variety of nutritives contained therein is rather limited, due to the incidence of incompatibility with the matrix, the concomitant taste or texture of the matrix, etc. The binder for such bars is specific to the type or species of nutrient source.

It is an object of applicants' invention to provide a novel food bar which may be consumed as a bar or dispersed in water to yield a familiar menu item.

It is a further object of this invention to provide food bars with an infinite variety of palatable and recognizable flavors.

It is another object to provide a food bar having desired caloric value and nutritional value.

Another object of this invention is to provide a novel food bar having a unique matrix imparting versatility to such food bar.

A further object is to provide a novel food bar having a unique matrix which is compatible with an infinite variety of nutrients, flavorants, etc.

Applicants' novel food bar is comprised of the combination of nutrients, flavorants, vitamins and/or minerals and a novel universal matrix.

Applicants have discovered and developed an all-purpose matrix which permits the achievement of the desired consistency, homogenuity, masticability, dispersibility, solubility, etc. of the food bars. The matrix of applicants' bar contains a combination of a polymer and a sugar. The polymer and sugar are combined in a water solution, co-dried, blended with the desired food components and then molded together into the food bar.

Not all polymers are capable of being used in applicants' matrix, but only those that are water-dispersible, film-forming, edible polymers, such as: methylcellulose, polyvinyl alcohol, polyvinylpyrrolidone, methyl cellulose, hydroxyethylcellulose, and ethers of methylcellulose and hydroxypropylmethylcellulose, and mixtures thereof. Sodium carboxymethylcellulose is particularly preferred because of its lack of taste.

The sugars that have been found to be effective are those having relatively low flavor levels such as sucrose, dextrose, fructose and lactose; lactose is particularly efficacious because of its lower sweetness level.

The ratio of applicants' unique matrix may be from 85 parts of sugar: 15 parts of polymer to 99.5 parts of sugar: 0.5 parts of polymer. The "parts" are parts by weight. Applicants have found 99:1 to be a particularly good ratio for the best universal result.

The sugar and polymer each possess some adhesive properties but the combination of the two components, as specified herein, produces unusual and unexpected binding effects, e.g., stronger, more plastic, more compatible and adaptable than the added effect of the two components if used separately.

The novel, all-purpose matrix is prepared by
 (a) Dissolving the sugar in water,
 (b) Dissolving the polymer in water,
 (c) Mixing (a) and (b),
 (d) Drying the solution.

In lieu of dissolving the sugar and polymer separately and subsequently mixing the two solutions, they may be dissolved in the same solution of water. It is necessary that enough water be present so that the sugar is dissolved and the polymer well dispersed. For example, 99 grams of sugar and 1 gram of polymer may be q.s.'ed to 1 liter of solution. More or less water may be used but the larger the quantity of water, the longer the drying time of the solution.

The solution containing the sugar and polymer may be dried by any desired method, such as freeze-dried, tray-dried or spray-dried.

The nutritional components are then combined with the dried matrix. The food components may be pre-cooked or raw, in a dried or natural state, triturated or sliced or minced, or in whole form. The limiting factor is the moldability of the bar. If the food component is too moist, the matrix may be unable to absorb all the moisture and maintain the bar form; a food, too bulky in shape, may also affect the capacity of the bar to remain in such form. However, applicants have found that the more surface area of the food available for contact with the matrix, the better the physical characteristics of the resulting bar. This result was also found to be true with regard to food components having lower moisture content, e.g., dehydrated foods.

The matrix and food components are mixed by any mechanical means, e.g. stirring, Hobart mixer, etc. The best results are obtained when the components are thoroughly mixed, so that a substantial degree of homogeneity is achieved. This is easier to achieve if the matrix is in the form of a free flowing powder.

An infinite variety of food components may be combined with applicants' unique matrix to form virtually any type menu item such as:
 *Main dishes.*—Beef stew, chili con carne, chicken and rice, shrimp creole, Welsh rabbit, chicken a la king, etc.
 *Soups.*—Cream of mushroom soup, beef barley soup, vegetable soup, clam chowder, etc.
 *Puddings.*—Tapioca pudding, chocolate pudding, plum pudding, banana cream pudding, etc.
 *Beverages.*—Coffee with cream and sugar, orange juice, apricot nectar, etc.

If the component is low in natural moisture content, e.g. raisins, it can be added in its natural state, preferably in small pieces; if it is high in moisture content, e.g., milk, it should be used in a dehydrated state. Food components, alone or in combination, may be dried, e.g., spray, tray or freeze dried, particularly those that are pre-cooked and not readily available in a dehydrated form.

A satisfactory bar is achieved if the bar contains 10% (by weight) matrix; in a few, isolated cases this figure may be as low as 5% to 8%. Applicants have found that the best, over-all results are obtained if the matrix constitutes from about 13% to 20% of the bar.

The quantity of food component chosen to be added to the matrix is a matter of taste, desired caloric and nutritional value, etc. It has been found that the finer the particles of the dehydrated materials, the greater the amount that may be combined with the matrix.

Certain modifications are helpful with specific food components. When chemical effervescent agents are utilized in the beverage components, glycerol is added to prevent premature reaction of the reagent in the presence of inherent moisture. Hygroscopicity is a problem when the food component is instant coffee; this is overcome if the ambient humidity during processing does not exceed about 20%. If the food components are greasy, e.g., bacon, pie crust, etc., it facilitates the processing if they are freeze-dried before they are combined with the matrix.

The matrix-component combination is then molded under pressure. Any of the usual pressure molding processes may be utilized, such as tableting machines and other commercial pressure molding machines and techniques, or manual apparatus and methods.

The degree of pressure in the molding process produces bars of varying physical properties. In general, the more pressure exerted, the harder the consistency of the bars. However, too high a pressure, e.g., 20,000 p.s.i., will produce a hard, easily broken, difficult-to-dissolve bar in most instances; too little a pressure, e.g. 500 p.s.i., will not usually affect a bar firm enough to hold its shape and form.

Applicants have found that a pressure of 6000 p.s.i. produces a universally satisfactory bar. However, other pressures lower or higher, may also produce suitable bars, depending upon the nature of the components and the degree of hardness desired of the bar.

Various components present pressure requirement problems. For example, if a component has a high fat content, high pressure will leech out too much fat and create a very hard bar; if the component is powdered coffee or fruit juice, high pressure will affect a hard, slowly soluble bar.

A general procedure for manufacturing a food bar is as follows:

(A) A predetermined quantity of the food component is weighed out together with the matrix and the two are dry blended.

(B) In most cases a small quantity of water is added to the dry blend to activate the matrix; the water does not have to be removed. Some of the water may be replaced by glycerol to aid in rehydration.

(C) A predetermined amount of the food component-matrix combination is weighed out and then pressure molded.

The dried matrix is added and blended thoroughly with the food component, for example using a Hobart-type mixer at low speed. To facilitate mixing and to activate the binding properties of the matrix glycerine is added.

The following example will illustrate a method of preparation of the novel, all-purpose matrix:

*Example I*

99 grams of lactose were dissolved in water. 1 gram of sodium carboxyethylcellulose was dispersed in water. The two solutions were combined, blended and diluted with water to 1 liter of solution. The liter of solution was then tray dried and the resultant was ground into a free-flowing powder, thereby producing an all-purpose matrix.

The above formed matrix is combined with various components to form diverse food bars as shown in the following examples:

*Example II*

Canned beef stem is freeze dried and granulated. 1000 grams of the granulated, freeze dried stew is combined and blended with 140 grams of matrix and 80 grams of water, by mechanical mixing. The blended material is then compression molded at 6,000 p.s.i. to form a beef stew food bar.

*Example III*

Chocolate pudding powder is reconstituted, freeze dried and granulated. 1000 grams of the granulated pudding is combined and blended with 140 grams of matrix and 120 grams of glycerine by mechanical mixing until it is homogeneous. It is then compression molded at 6,000 p.s.i. to form a chocolate pudding food bar.

*Example IV*

Canned chicken a la king is freeze dried and granulated. 1000 grams of granulated chicken a la king is combined and blended with 200 grams of matrix by mechanical mixing. It is then compression molded at 6,000 p.s.i. to form a creamed chicken a la king food bar.

*Example V*

500 grams of freeze dried beef is combined and blended with 260 grams of instant non-fat dry milk solids, 172 grams of instant pregelatinized tapioca starch, 58 grams of instant pregelatinized corn-starch, 2 grams of pepper oil plated on salt, 2 grams of onion oil plated on salt, 140 grams of matrix and 160 grams of glycerine, by mechanical mixing. It is then compression molded at 6,000 p.s.i. to form a creamed beef food bar.

*Example VI*

1000 grams of beef barley dry soup mix are combined and blended with 140 grams of matrix and 80 grams of glycerine by mechanical mixing. The blend is then compression molded at 6,000 p.s.i. to form a beef barley soup food bar.

*Example VII*

1000 grams of freeze dried tomato juice is combined and blended with 100 grams of starch, 140 grams of matrix and 60 grams of glycerine by mechanical mixing. The blend is then compression molded at 6,000 p.s.i. to form a tomato juice food bar.

The caloric value of the food bars may be varied. Assuming it is desirable to produce a tomato juice food bar having a greater number of calories than Example VII it may be accomplished as follows:

*Example VIII*

142 grams of tomato juice, 25 grams of freeze dried tomato juice, 24 grams of instant pregelatinized corn starch, 15 grams of matrix and 15 grams of hydrogenated emulsified cottonseed shortening with added non-fat milk solids are combined and blended by mechanical mixing. The blend is then compression molded at 6,000 p.s.i. to form a higher caloric value tomato juice food bar.

It is also possible to incorporate vitamins and minerals into a food bar in order to provide a palatable form of dietary supplement or source of daily requirements, e.g.,

*Example IX*

To Example VII, prior to mixing, is added—

| | | |
|---|---|---|
| Calcium (dicalcium phosphate) | gms | 0.8 |
| Iron (as sulfate) | mgs | 12 |
| Vitamin A (25 mg.) | U.S.P. units | 5000 |
| Thiamine mononitrate | mgs | 1.5 |
| Riboflavin | mgs | 1.5 |
| Niacinamide | mgs | 13 |
| Vitamin C (ascorbic acid) | mgs | 72 |
| Vitamin D | U.S.P. units | 400 |

The mixture is then blended and compressed at 6,000 p.s.i. to form a tomato juice bar having the minimum daily requirement of vitamins and minerals for an average adult.

These bars are readily dispersed in hot, warm or cold water. In order to hasten the dispersion, the bars may be broken into smaller segments and/or placed in hot water. The nature of certain combinations results in more ready dispersion than others, but satisfactory dispersion is generally achieved within a reasonable length of time, i.e., 15 to 20 minutes. The resulting menu item may be consumed in the hot state, e.g., a soup, or it may be subsequently chilled, e.g., a pudding, or frozen, e.g. a fruit juice bar, or eaten at room temperature.

In order to preserve the food bars for storage, it is best that they be packaged in moisture-proof containers. While there are many such types of packaging, applicants have found that a heat-sealed metalized polyethylene pouch provides a suitable packaging for the bars.

Applicants' examples illustrate their invention but they are not intended to limit the invention to that which is shown.

What is claimed is:

1. A novel food bar which may be eaten as such or readily dispersed in water comprising the combination of an all purpose matrix blended with a food component, said all purpose matrix comprising the co-dried combination of a water-dispersible film-forming, edible polymer and a low flavor level sugar in which the ratio of polymer to sugar is in the range of 15 to 0.5 parts:85 to 99.5 parts.

2. A novel food bar as in claim 1 in which the polymer is selected from the group consisting of sodium carboxymethylcellulose, polyvinyl alcohol, polyvinyl pyrrolidone, ethers of methylcellulose and hydroxypropylmethylcellulose and mixtures thereof.

3. A novel food bar as in claim 1 in which the sugar is selected from the group consisting of sucrose, dextrose, fructose and lactose.

4. A novel food bar as in claim 1 in which the polymer is selected from the group consisting of sodium carboxymethylcellulose, polyvinyl alcohol, polyvinylpyrrolidone, ethers of methylcellulose and hydroxypropylmethylcelluose and mixtures thereof and the sugar selected from the group consisting of sucrose, dextrose, fructose and lactose.

5. A food bar according to claim 1 in which the polymer is sodium carboxymethylcellulose and the sugar is lactose.

6. A novel food bar according to claim 3 in which the food component is dehydrated soup mix.

7. A novel food bar according to claim 3 in which the ratio of polymer to sugar is 1:99.

8. The process of preparing a novel food bar consisting of the steps of co-drying a water-dispersible, film-forming edible polymer and a low flavor level sugar in which the ratio of polymer to sugar is in the range of 15 to 0.5 parts:85 to 99.5 parts and blending the co-dried matrix with a food component and pressure molding the combination into a bar.

References Cited

UNITED STATES PATENTS

| | | | |
|---|---|---|---|
| 2,278,466 | 4/1942 | Musher | 99—124 XR |
| 2,555,465 | 6/1951 | Bogin et al. | 99—28 XR |
| 2,970,063 | 1/1961 | Jordan et al. | 106—208 |
| 3,089,824 | 5/1963 | Wurster | 167—82 |

A. LOUIS MONACELL, *Primary Examiner.*

RAYMOND N. JONES, *Examiner.*

J. M. HUNTER, *Assistant Examiner.*